(12) United States Patent
Lewis et al.

(10) Patent No.: US 9,056,439 B2
(45) Date of Patent: Jun. 16, 2015

(54) BREATHABLE INSULATION FOR CORROSION REDUCTION

(71) Applicant: Work Warm DBA Aeris, Mt. Pleasant, UT (US)

(72) Inventors: Dale H. Lewis, Spring City, UT (US); Don E. Thomason, South Jordan, UT (US)

(73) Assignee: AERIS, Mt. Pleasant, UT (US)

( * ) Notice: Subject to any disclaimer, the term of this patent is extended or adjusted under 35 U.S.C. 154(b) by 0 days.

(21) Appl. No.: 14/174,739

(22) Filed: Feb. 6, 2014

(65) Prior Publication Data

US 2014/0220277 A1 Aug. 7, 2014

Related U.S. Application Data

(60) Provisional application No. 61/761,634, filed on Feb. 6, 2013, provisional application No. 61/815,643, filed on Apr. 24, 2013.

(51) Int. Cl.
*F16L 9/14* (2006.01)
*B32B 3/26* (2006.01)
*F16L 59/02* (2006.01)
*F16L 59/12* (2006.01)

(52) U.S. Cl.
CPC ............ *B32B 3/26* (2013.01); *Y10T 29/49826* (2015.01); *Y10T 428/13* (2015.01); *Y10T 428/1372* (2015.01); *F16L 59/021* (2013.01); *F16L 59/12* (2013.01)

(58) Field of Classification Search
CPC .................................. F61L 59/14; B32B 3/26
USPC ...................... 138/148, 149; 428/36.91, 36.5; 220/592.25
See application file for complete search history.

(56) References Cited

U.S. PATENT DOCUMENTS

| | | | |
|---|---|---|---|
| 3,665,968 A | * | 5/1972 | De Putter .................... 138/141 |
| 4,742,580 A | | 5/1988 | Phillips, Jr. et al. |
| 4,777,186 A | | 10/1988 | Stang et al. |
| 4,787,105 A | | 11/1988 | Phillips et al. |
| 4,823,407 A | | 4/1989 | Phillips, Jr. et al. |
| 4,843,647 A | | 7/1989 | Phillips, Sr. et al. |
| 4,845,862 A | | 7/1989 | Phillips, Jr. et al. |
| 4,887,317 A | | 12/1989 | Phillips, Sr. et al. |
| 4,951,319 A | | 8/1990 | Phillips, Jr. et al. |
| 5,183,299 A | * | 2/1993 | Hallerstrom et al. ........... 285/47 |
| 5,699,632 A | * | 12/1997 | Stout et al. ...................... 43/25 |
| 5,981,020 A | * | 11/1999 | Sutherland et al. ............. 428/85 |

(Continued)

FOREIGN PATENT DOCUMENTS

WO 2006002440 A2 1/2006

OTHER PUBLICATIONS

PCT/US2014/015178 International Search Report and Written Opinion mailed May 23, 2014.

(Continued)

*Primary Examiner* — Patrick F Brinson
(74) *Attorney, Agent, or Firm* — Kunzler Law Group, PC

(57) ABSTRACT

Apparatuses for insulation and a method for insulating a pipeline are disclosed. An insulation layer may include a flexible polyurethane foam. The foam may be generated by polymerization in a pressurizable chamber at a pressure sufficient to prevent the foam from completely filling the chamber. The foam may be configured to carry moisture away from an object when disposed against the object.

16 Claims, 3 Drawing Sheets

(56) References Cited

U.S. PATENT DOCUMENTS

| | | | |
|---|---|---|---|
| 6,376,068 B1 | 4/2002 | Garcia-Ramirez et al. | |
| 7,207,527 B2 | 4/2007 | Opperthauser | |
| 7,407,197 B2 * | 8/2008 | Gronquist | 285/47 |
| 7,559,343 B1 * | 7/2009 | Vujic et al. | 138/148 |
| 8,087,432 B2 * | 1/2012 | Rudi et al. | 138/149 |
| 2006/0057918 A1 * | 3/2006 | Burnett | 442/132 |
| 2006/0216492 A1 * | 9/2006 | Thomson | 428/304.4 |
| 2009/0209155 A1 | 8/2009 | Goulet | |
| 2011/0011601 A1 * | 1/2011 | Ono et al. | 169/48 |
| 2012/0040138 A1 | 2/2012 | Weidinger et al. | |

OTHER PUBLICATIONS

Phillips, Thermal Johns (Tj's), http://www.jimsway.com/atjs1.html, Received Jan. 9, 2013, Retrieved Feb. 10, 2014.

Phillips, The PALS History—Clothing 2200, Phillips Arctic Living System, http://www.youtube.com/watch?v=SxqV8FgLZeg&feature=relmfu, Nov. 2, 2012.

* cited by examiner

BREATHABLE INSULATION FOR CORROSION REDUCTION

CROSS-REFERENCE TO RELATED APPLICATIONS

This application claims the benefit of U.S. Provisional Patent Application No. 61/761,634, entitled "INSULATING APPAREL" and filed on Feb. 6, 2013 for Dale H. Lewis et al., and U.S. Provisional Patent Application No. 61/815,643, entitled "BREATHABLE INSULATION FOR CORROSION REDUCTION" and filed on Apr. 24, 2013 for Dale H. Lewis et al., which are incorporated herein by reference.

FIELD

The present disclosure, in various embodiments, relates to insulation and more particularly relates to breathable insulation.

BACKGROUND

A layer of insulation can reduce the rate of heat transfer between an object and its environment. Insulation can be used to help maintain the temperature of an object in hot or cold environments, or to allow safe handling of a hot or cold object. For example, insulation for an oil pipeline may promote free flow of oil at higher than ambient temperatures, and may also help pipeline workers avoid discomfort or burns.

In addition to reducing heat transfer, many types of insulation also prevent or reduce moisture transfer between the insulated object and its environment, and some types of insulation may even promote the development of moisture on the object. Trapped moisture between the insulation and the object may cause corrosion at the interface of a metal surface of the object and the insulation, and may also reduce the effectiveness of the insulation. Insulation that traps or promotes moisture near an object may also carry the moisture to other parts of the insulated object, causing corrosion to spread rapidly. Additionally, many types of insulation may release chlorides into a trapped moisture layer, causing further pitting, corrosion, and/or cracking.

Corrosion under insulation ("CUI") as described above may become particularly severe in circumstances where it is difficult or costly to detect corrosion, or to inspect an object covered by insulation. In the refining and chemical industries, where insulated pipes are used, a large percentage of leaks and piping maintenance costs may be related to CUI.

SUMMARY

The subject matter of the present application has been developed in response to the present state of the art, and in particular, in response to the problems and needs in the insulation arts that have not yet been fully solved by currently available insulation. Accordingly, the subject matter of the present application has been developed to provide insulation that overcomes many of the shortcomings of the prior art.

An apparatus is disclosed for insulating an object. In one embodiment, an insulation layer includes a flexible polyurethane foam. In a further embodiment, the foam is generated by polymerization in a pressurizable chamber at a pressure sufficient to prevent the foam from completely filling the chamber. In a certain embodiment, the foam is configured to carry moisture away from the object when disposed against the object.

In some embodiments, the object may include a pipe, a valve, a valve cover, and/or a pipe support. In further embodiments, the insulation layer may surround the object.

In one embodiment, a moisture vapor transmission rate ("MVTR") of the insulation layer is approximately 1,150 $g/m^2/24$ hrs. In another embodiment, a MVTR of the insulation layer is in a range from approximately 900 $g/m^2/24$ hrs to approximately 1,200 $g/m^2/24$ hrs. In a further embodiment, a thickness of the insulation layer when uncompressed is within a range of approximately ¼ inch to approximately 1 inch. In a certain embodiment, an indentation load deflection ("ILD") of the insulation layer is in a range from approximately 10.0 lbs/50 $in^2$ to approximately 32.0 lbs/50 $in^2$. In some embodiments, a density of the insulation layer is in a range from approximately 1.1 $lbs/ft^3$ to approximately 1.65 $lbs/ft^3$.

In one embodiment, the foam includes fire retardant material, heat resistant material, and/or flameproof material. In another embodiment, a fire protection layer includes fire retardant material, heat resistant material, and/or flameproof material. In a further embodiment, the fire protection layer may include oxidized polyacrylonitrile fibers.

In one embodiment, a shell layer includes wind resistant, breathable material. In a further embodiment, the shell layer includes an outer layer of the apparatus. In a certain embodiment, the apparatus includes an inner lining layer. In a further embodiment, the insulation layer is disposed between the inner lining layer and the shell layer.

Another apparatus is disclosed. In one embodiment, the apparatus includes a pipe. In a further embodiment, an insulation layer surrounds the pipe. In a certain embodiment, the insulation layer includes open cell foam configured to carry moisture out of an interstitial space between the insulation layer and the pipe, and away from the pipe.

In one embodiment, the open cell foam includes fire retardant material, heat resistant material, and/or flameproof material. In another embodiment, shell layer is applied over the insulation layer. In a further embodiment, the shell layer includes a wind resistant, breathable material. In a certain embodiment, a fire protection layer includes fire retardant material, heat resistant material, and/or flameproof material. In a further embodiment, the fire protection layer may include oxidized polyacrylonitrile fibers.

In one embodiment, a MVTR of the insulation layer is approximately 1,150 $g/m^2/24$ hrs. In another embodiment, a MVTR of the insulation layer is in a range from approximately 900 $g/m^2/24$ hrs to approximately 1,200 $g/m^2/24$ hrs.

A method is presented for manufacturing pipeline insulation. In one embodiment, the method includes providing an insulation layer. In a further embodiment, the insulation layer includes flexible polyurethane foam. In a certain embodiment, the foam is generated by polymerization in a pressurizable chamber at a pressure sufficient to prevent the foam from completely filling the chamber. In further embodiments, the method includes coupling fasteners to the insulation layer for securing the insulation layer about at least a portion of a pipeline.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the disclosure will be described and explained with additional specificity and detail through the use of the accompanying drawings, in which.

DETAILED DESCRIPTION

Figure 1:
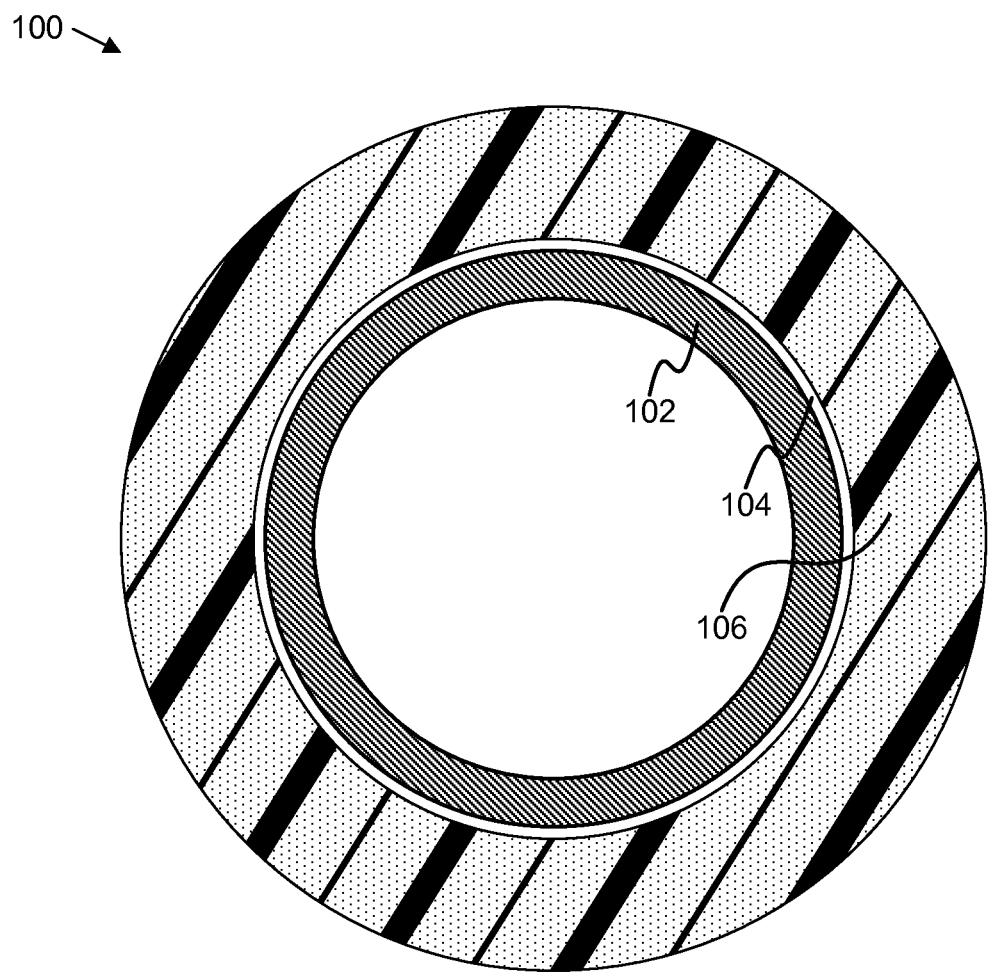
FIG. 1 is a cross-sectional end view illustrating one embodiment of an apparatus for insulation.

FIG. 1 depicts a cross section view of one embodiment of an apparatus 100 for insulation. In the depicted embodiment, the apparatus 100 includes an insulation layer 106 disposed against a metal object 102, forming an interstitial space 104 between the insulation layer 106 and the metal object 102. In general, the insulation layer 106 may include a foam configured to reduce heat transfer between the metal object 102 and its environment while absorbing moisture and carrying it away from the metal object 102 and out of the interstitial space 104, thus reducing the likelihood of moisture in the interstitial space 104 corroding the metal object 102. Although the object 102 is described herein as being made from metal, in some embodiments, the object can be made from any of various materials susceptible to moisture damage, such as plastics and composites.

In certain embodiments, the apparatus 100 may include additional materials not shown in FIG. 1. For example, the apparatus 100 may include liners, exterior layers, or the like, as well as an adhesive, snaps, zippers, ties, or other materials used to secure the insulation layer 106 against the metal object 102. In light of this disclosure, it is clear that in various embodiments, the apparatus 100 may include various other materials, in addition to the insulation layer 106 disposed against the metal object 102.

In the depicted embodiment, the metal object 102 is shown as a cylindrical pipe. However, in some embodiments, the metal object 102 may be any type of metal object 102, such as a pipe, a valve, a valve cover, a pipe support, a tank, a handle, a flat metal surface, a metal portion and/or surface of an object including nonmetallic materials, or the like. In a certain embodiment, the metal object 102 may be part of an oil or gas pipeline.

In some embodiments, a temperature and humidity gradient across the insulation layer 106, caused by heat from the metal object 102, drives moisture from the interstitial space 104 toward the outside of the insulation layer 106. For example, in one embodiment, the metal object 102 may be a heated pipeline, so that the heat of the pipeline drives moisture through the insulation layer 106. In another embodiment, the metal object 102 may contain hot materials, and the heat of the contents of the metal object 102 may drive moisture through the insulation away from the object. For example, in a further embodiment, the metal object 102 may be a commercial or residential hot water pipe, and heat from the water in the pipe may drive moisture through the insulation away from the pipe.

As used herein, directional words such as "inner," "outer," "up," "down," "upper," "lower," "horizontal," "vertical," "left," "right," and the like, refer to the perspective of the metal object 102. Thus, for example, an "inner" portion of the apparatus 100 would be closer to the metal object 102 than an "outer" portion, and heat may rise to an "upper" portion of the metal object 102. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

In the depicted embodiment, the insulation layer 106 is disposed against the metal object 102. In one embodiment, the insulation layer 106 may include foam material. When disposed against the metal object 102, foam material of the insulation layer 106 may carry moisture away from the metal object 102. Foam material of the insulation layer 106 may provide breathability for moisture transfer, while air in the foam protects the metal object 102 from extreme temperatures. In further embodiments, the foam material of the insulation layer 106 may be an engineered polymer. In certain embodiments, the insulation layer 106 may include open cell foam. As compared to closed cell foam, in which each cell of the foam structure is enclosed by its faces, open cell foam has open, permeable cells, in which some or all faces of the foam cells are missing, allowing air and moisture to move within the foam. Therefore, in some embodiments, an insulation layer 106 including open cell foam material may reduce corrosion under insulation ("CUP") by absorbing moisture and allowing the moisture to move freely and rapidly away from the metal object 102.

In certain embodiments, heat from the metal object 102 creates a temperature gradient within the foam, so that moisture within the foam moves away from the metal object 102, and may evaporate at the outside of the insulation layer 106. Thus, the foam nearest the metal object 102 may dry quickly, which reduces the likelihood of CUI and preserves the effectiveness of the dry portion of the insulation layer 106 for reducing heat transfer, even if the apparatus 100 is not completely dry. In a further embodiment, even if the apparatus 100 is saturated with moisture, the temperature gradient from the heat of the metal object 102 may move moisture through open cell foam of the insulation layer 106 quickly enough for the metal object 102 to be adequately dry in a short time period, thus reducing opportunities for corrosion.

In one embodiment, the insulation layer 106 may include foam material with a moisture vapor transmission rate ("MVTR"), as measured using the ASTM Upright Cup test, of approximately 1,150 g/m$^2$/24 hrs. In another embodiment, the insulation layer 106 may include foam material with an MVTR in a range from approximately 900 g/m$^2$/24 hrs to approximately 1,200 g/m$^2$/24 hrs. (As used herein, a measurement is "approximately" equal to a stated value if it is within 10% of the stated value).

According to some embodiments, a thickness of the insulation layer 106 when uncompressed may be within a range of approximately ¼ inch to approximately 1 inch. In light of this disclosure, it is clear that the insulation layer 106 may include various types of foam material at various thicknesses, which depend on the intended environment and application for the apparatus 100, as well as a desired level of protection from cold or hot temperatures. The relative thicknesses of the metal object 102, interstitial space 104, and insulation layer 106 in the depicted embodiment are to be considered as illustrative and not limiting, and may vary in further embodiments of the apparatus 100.

In some embodiments, the insulation layer 106 may include polyurethane foam. In further embodiments, polyurethane foam material for the insulation layer 106 may be flexible. In a certain embodiment, the insulation layer 106 may include flexible polyurethane foam produced by restricted expansion foaming. Flexible polyurethane foam produced by restricted expansion foaming is generated by polymerization in a pressurizable chamber at a pressure sufficient to prevent the foam from completely filling the chamber. Embodiments of restricted expansion foaming, and of flexible polyurethane foam produced thereby, are described in U.S. Pat. No. 4,777,186 to John W. Stang et al., entitled "Restricted expansion foaming and the flexible polyurethane foam thereby produced," issued Oct. 11, 1988, which is incorporated herein by reference in its entirety.

Foams produced by restricted expansion foaming exhibit useful properties, including a high indentation load deflection ("ILD") to density ratio. ILD refers to the firmness of a foam, determined by measuring the back force that a sample of the foam will exert against a compression plate as per ASTM 3574. Because compressing a foam pushes air out of the cells of the foam, a compressed foam may not insulate as well as an uncompressed foam. However, foam material in an insulation layer 106 may become compressed during movement or use of the metal object 102. Thus, in some embodiments, the insulation layer 106 includes foam material with a high ILD, which will rapidly return to an uncompressed (and better insulating) state. However, many high ILD foams also have high densities, which may result in higher costs to transport or install the apparatus 100. Thus, in certain embodiments, the insulation layer 106 includes a foam with a high ILD to density ratio. In some embodiments, the insulation layer 106 includes a foam produced by restricted expansion foaming, with a high ILD to density ratio, while in other embodiments, the foam may be produced in another way, but may still include useful ILD and density properties.

In one embodiment, the insulation layer 104 may include foam material with an ILD within a range from approximately 10.0 lbs/50 in$^2$ to approximately 32.0 lbs/50 in$^2$ (at 25% deflection of a 4" thick sample). In a certain embodiment, the insulation layer 104 may include foam material with a density within a range from approximately 1.1 lbs/ft$^3$ to approximately 1.65 lbs/ft$^3$. In a further embodiment the insulation layer 104 may include foam material allowing an air flow within a range from approximately 2.6 ft$^3$/min to approximately 4.8 ft$^3$/min (through a 2"×2"×1" foam sample at 0.5-inch water pressure differential).

In some embodiments, foam material of the insulation layer 106 may include fire retardant material, heat resistant material, and/or flame proof material. For example, in one embodiment, the insulation layer 106 may include foam material treated with a fire retardant chemical. In another embodiment, the insulation layer 106 may include a foam material made of heat resistant material. In some embodiments, the metal object 102 may be a pipeline, valve, or tank with flammable contents, and fire hazards from the flammable contents of the metal object 102 leaking into the insulation layer 106 may be reduced by an insulation layer 106 including fire retardant material, heat resistant material, and/or flame proof material.

In some embodiments, the insulation layer 106 may surround the metal object 102. For example, in certain embodiments, the metal object 102 may be a roughly cylindrical object, such as pipe, a valve, a valve cover, a pipe support, a tank, or the like, and the insulation layer 106 may include a strip of foam material wrapped in a spiral or annular shape around the metal object 102. Alternatively, in another embodiment, the insulation layer 106 may include a width of foam disposed around the metal object 102 so that edges of the insulation layer 106 meet at a seam on one side of the metal object 102. In one embodiment, fasteners may be disposed along the seam for securing the insulation layer 106 around the metal object 102. For example, in various embodiments, snaps, hook and loop fasteners, ties, or the like may be attached to the insulation layer 106 along the seam. In light of this disclosure, many fasteners are clear which may be suitable for securing the insulation layer 106 around the metal object 102. In one embodiment, the fasteners may be directly coupled or attached to the insulation layer 106. In another embodiment, the fasteners may be indirectly coupled to the insulation layer. For example, in one embodiment, the fasteners may be attached to another layer that is, in turn, attached to the insulation layer 106.

In certain embodiments, the insulation layer 106 may surround the metal object 102 by being disposed against each side surface of the metal object 102, but not the ends. For example, in one embodiment, the metal object 102 may be a pipe, and the insulation layer 106 may surround the sides of the pipe but leave the ends open for fluids to enter and exit the pipe. In another embodiment, the insulation layer 106 may surround the metal object 102 by being disposed against each side surface of the metal object 102, and the end surfaces. For example, in one embodiment, the metal object 102 may be a tank, such as a commercial or residential hot water heater tank, and the insulation layer 106 may surround the sides and ends of the tank. In general, an insulation layer 106 may be formed with a cavity for the metal object 102, wrapped around the metal object 102, or the like.

In still another embodiment, the insulation layer 106 may not surround the metal object 102, but may be disposed against the metal object 102. For example, in one embodiment, the metal object 102 may be a pipe, and the insulation layer 106 may be disposed at an interface between the pipe and a pipe support at the bottom of the pipe, thus preventing heat transfer and corrosion between the pipe and the pipe support.

In the depicted embodiment, the apparatus 100 includes an insulation layer 106 disposed against a metal object 102, forming an interstitial space 104 between the insulation layer 106 and the metal object 102. The interstitial space 104 is shown with a uniform, visible thickness for illustrative purposes in the depicted embodiment. In various embodiments, however, the interstitial space 104 may be larger or smaller than in the depicted embodiment, and may or may not be uniform around the metal object 102. For example, in one embodiment, the interstitial space 104 may be smaller than depicted, and may include a distance between the metal object 102 and the insulation layer 106 that varies at different points near the metal object 102. As a further example, in a certain embodiment, the interstitial space 104 may include small spaces from open cells at the inner surface of a foam insulation layer 106, and larger spaces formed by wrinkles in the foam insulation layer 106, which form as the insulation layer 106 is wrapped around or otherwise disposed against the metal object 102.

In certain embodiments, disposing the insulation layer 106 against the metal object 102 may form the interstitial space 104 with included ambient moisture due to humidity, rainfall, or the like. In further embodiments, moisture may enter the interstitial space 104 due to wet conditions, or, if the metal object 102 is a pipe or container for fluids, due to leakage from the metal object 102. In various embodiments, many factors may lead to the presence of moisture in the interstitial space 104.

Without an insulation layer 106, a warm metal object 102 might cause rapid evaporation of moisture from the surface of the metal object 102, reducing opportunities for corrosion to occur. However, if insulation is used to preserve the warm temperature of the metal object 102, moisture and oxygen trapped in an interstitial space 104 may contribute to CUI. But, in various embodiments of the apparatus 100, the insulation layer 106 is breathable, and heat from the metal object 102 causes a temperature gradient in the insulation layer 106, which in turn causes moisture that would otherwise be trapped in the interstitial space 104 to travel away from the metal object 102. The movement of moisture through the insulation layer 106 reduces the moisture content of the interstitial space 104 and thereby reduces the likelihood of CUI.

Figure 2:
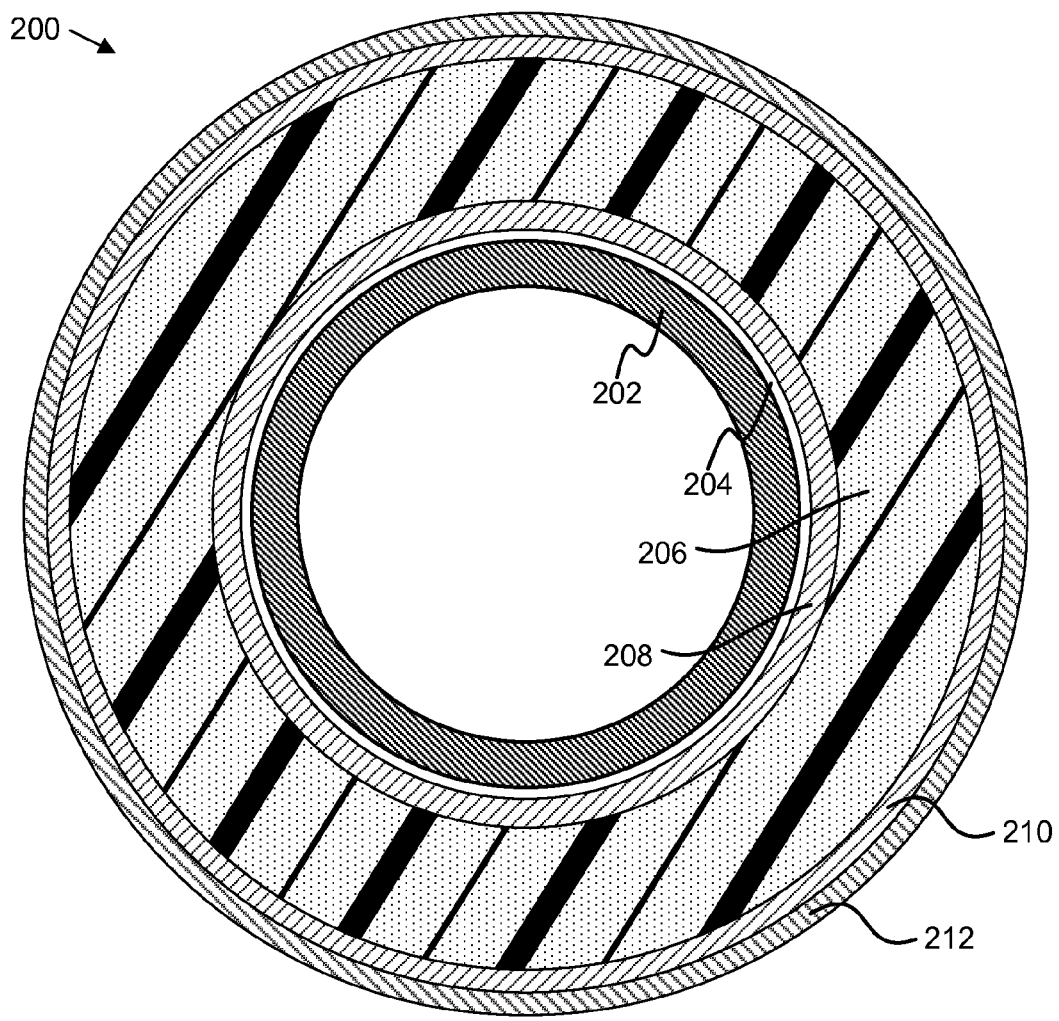
FIG. 2 is a cross-sectional end view illustrating another embodiment of an apparatus for insulation.

FIG. 2 depicts a cross section view of another embodiment of an apparatus 200 for insulation including a insulation layer 206 disposed against a metal object 202, forming an interstitial space 204 between the insulation layer 206 and the metal object 202 substantially as described above with reference to FIG. 1, with like numbers referring to like elements. In the depicted embodiment, the apparatus 200 also includes an inner lining layer 208, a shell layer 210, and a fire protection layer 212. In various embodiments, the apparatus 200 may optionally include or omit the inner lining layer 208, the shell layer 210, and/or the fire protection layer 212, and may optionally include further layers not shown in the depicted embodiment.

In the depicted embodiment, the apparatus 200 includes an inner lining layer 208. In the depicted embodiment, the inner lining layer 208 is an inner layer of the apparatus 200, and the insulation layer 206 is disposed between the inner lining layer 208 and the shell layer 210. In one embodiment, the inner lining layer 208 may facilitate installation of the insulation layer 206 by reducing friction between the insulation layer 206 and the metal object 202. In another embodiment, the inner lining layer 208 may prevent melting or other heat damage of the insulation layer 206 due to a hot metal object 202. Because moisture transfer away from the metal object 202 and through the insulation layer 206 prevents CUI, the inner lining layer 208 should not unduly restrict the flow of moisture from the metal object 202 to the insulation layer 206. Accordingly, in some embodiments, the inner lining layer 208 has an MVTR that is higher than the MVTR of the insulation layer 206. In various embodiments, the inner lining layer 208 may include ventilated, breathable and/or wicking fabrics, such as nylon or polyester mesh, tricot knit, or the like. In light of this disclosure, it is clear that many types of breathable, heat resistant, and/or friction-reducing material may be used for the inner lining layer 208.

In certain embodiments, the shell layer 210 is made from a breathable material. A breathable shell layer 210 provides moisture transferability from the apparatus 200 into the surrounding environment. In some embodiments, the shell layer 210 may protect the insulation layer 206 from weather damage or ultraviolet exposure in outdoor environments. Because the insulation layer 206 allows moisture transfer away from the metal object 202, evaporation may cause cooling at the outer surface of the apparatus 200, and remaining moisture in the insulation layer 206 may rapidly transfer heat away from the metal object 202, reducing the effectiveness of the apparatus 200 for insulation. Accordingly, in a further embodiment, the shell layer 210 also may be made from a wind-resistant or windproof material. A wind-resistant (or windproof), breathable shell layer 210 allows the apparatus 200 to dry out (or to remain dry), while retaining heat from the metal object 202 and limiting the effects of evaporative cooling that could be caused by wind penetration through the shell layer 210. In a certain embodiment, the wind-resistant, breathable shell layer 210 may also be water resistant, to prevent accumulation of external moisture from rain, snow, or the like in the insulation layer 206, but remain sufficiently breathable to allow moisture transferability out of the insulation layer 206.

In some embodiments, the shell layer 210 may be formed from a fabric material. For example, in one embodiment, the shell layer 210 may be made from a fabric such as polyester taffeta, nylon taffeta, ripstop nylon, or the like. For example, in one specific embodiment, the fabric of the shell layer 210 is the fabric specified by 100% Polyester Micro Taffeta, Anti-static, 180×13/50D×50D, 100 gm/yd, 59/60". In another embodiment, the shell layer 210 may include another, similar fabric. In some embodiments, the shell layer 210 may include wind-resistant, breathable material other than a fabric-type material. In light of this disclosure, it is clear that other materials and combinations of materials are suitable for use as the shell layer 210 for the apparatus 200.

In the depicted embodiment, the shell layer 210 is disposed or applied over the insulation layer 206, as an outer layer of the apparatus 200. In one embodiment, the shell layer 210 may be the outermost layer of the apparatus 200. In another embodiment, however, another layer may be the outermost layer of the apparatus 200, but the shell layer 210 may be disposed over the insulation layer 206, as one of the outer layers of the apparatus 200. In a certain embodiment, the shell layer 210 may envelop the insulation layer 206, thus forming both an inner layer and an outer layer of the apparatus 200. In various embodiments, a material, color, pattern, or the like may be selected for the shell layer 210 based on a desired appearance for the apparatus 200. For example, in one embodiment the metal object 202 may be an oil pipeline and the shell layer 210 may be white or gray, to reduce the visual impact of the pipeline in an arctic environment, or may include another color or pattern to increase or reduce the pipeline's visibility in another environment.

In one embodiment, the fire protection layer 212 may include fire retardant, heat resistant, and/or flameproof material. The apparatus 200 may include the fire protection layer 212 to protect the metal object 202, or its surrounding environment, from fire. For example, in certain embodiments, the apparatus 200 with a fire protection layer 212 may be useful for oil or gas pipelines, or for other metal objects 202 with flammable contents. Although, in the depicted embodiment, the fire protection layer 212 is depicted as separate from the other layers, in another embodiment, the fire protection layer 212 may replace another layer. For example, in one embodiment, a windproof but breathable fire protection layer 212 may be a durable outer shell, replacing the shell layer 210. In another embodiment, a more breathable fire protection layer 212 may replace the inner lining layer 208. In a further embodiment, the fire protection layer 212 may encase the insulation layer, 206, replacing both the shell layer 210 and the inner lining layer 208.

In one embodiment, the fire protection layer 212 may include oxidized polyacrylonitrile fibers, such as those in the flame-resistant or flame-retardant fabrics sold under the CarbonX trademark. In another embodiment, the fire protection layer 212 may include aramid fibers, such as those in the flame-resistant material sold under the Nomex trademark. In yet another embodiment, the fire protection layer 212 may include materials suitable for extreme heat, such as texturized fiberglass, vermiculite, aluminized materials, or the like. In light of this disclosure, it is clear that in various embodiments, many different materials are suitable for the fire protection layer 212.

In some embodiments, the apparatus 200 does not include a fire protection layer 212, and the shell layer 210 is an environment protection layer that protects the insulation from the harsh effects of the environment, such as wind, rain, snow, ice, UV rays, etc.

In various embodiments of an apparatus 200 for insulation, each of the various layers, such as the insulation layer 206, the inner lining layer 208, the shell layer 210, or the fire protection layer 212 may be attached to an adjacent layer, disposed against an adjacent layer without attachment to the adjacent layer, or a combination of the above. For example, in one embodiment, the inner lining layer 208 may be attached to the insulation layer 206 by sewing, while the shell layer 210 may fasten independently around the insulation layer 206 and the metal object 202 once the insulation layer 206 is disposed against the metal object 202. As another example, in another embodiment, the insulation layer 206, the inner lining layer 208, the shell layer 210, and/or the fire protection layer 212 may be quilted together. Stitching through the layers, or quilting, may, in certain embodiments, prevent the layers from shifting relative to each other, and keep the insulation layer 206 in place in the apparatus 200.

Figure 3:
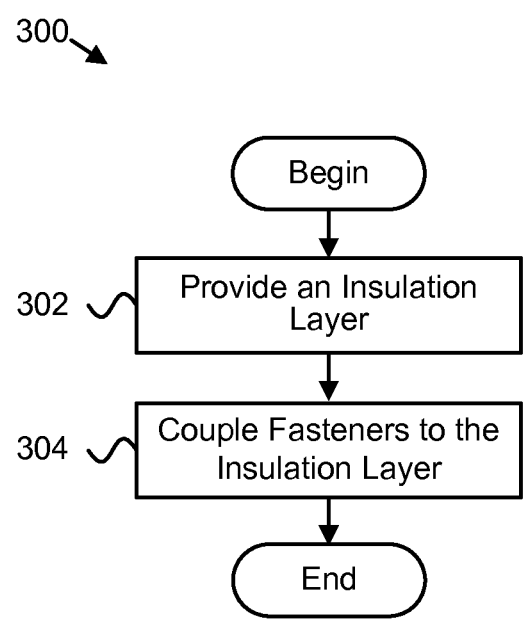
FIG. 3 is a schematic flow diagram illustrating one embodiment of a method for manufacturing pipeline insulation.

FIG. 3 depicts a schematic flow diagram of a method 300 for manufacturing pipeline insulation. The method 300 begins and an insulation layer 106, 206 is provided 302. In some embodiments, the insulation layer 106, 206 may include flexible polyurethane foam. In further embodiments, the flexible polyurethane foam may be generated by polymerization in a pressurizable chamber at a pressure sufficient to prevent the foam from completely filling the chamber. Fasteners are coupled 304 to the insulation layer 106, 206 for securing the insulation layer 106, 206 around at least a portion of a pipeline, and the method 300 ends.

Although some of the embodiments of insulating material disclosed herein have been described as being operable with a pipeline, it is recognized that embodiments of the present disclosure may also be operable in other types of systems. For example, an insulation layer 106, 206 may be disposed against any warm metal object 102, 202, such as an oven, or the like, to retain heat while reducing the likelihood of CUI.

Reference throughout this specification to "one embodiment," "an embodiment," or similar language means that a particular feature, structure, or characteristic described in connection with the embodiment is included in at least one embodiment of the subject matter of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the subject matter of the present disclosure, however, absent an express correlation to indicate otherwise, an implementation may be associated with one or more embodiments.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

The present subject matter may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus for insulating an object, the apparatus comprising:
   an insulation layer comprising a flexible polyurethane foam, the foam generated by polymerization in a pressurizable chamber at a pressure sufficient to prevent the foam from completely filling the chamber, wherein the foam is configured to carry moisture away from the object when disposed against the object; and a shell layer comprising wind resistant, breathable material, the shell layer comprising an outer layer of the apparatus, wherein the object comprises one or more of a pipe, a valve, a valve cover or a pipe support and wherein the insulation surrounds the object.

2. The apparatus of claim 1, wherein a moisture vapor transmission rate ("MVTR") of the insulation layer is approximately 1,150 g/m2/24 hrs.

3. The apparatus of claim 1, wherein a moisture vapor transmission rate ("MVTR") of the insulation layer is in a range from approximately 900 g/m2/24 hrs to approximately 1,200 g/m2/24 hrs.

4. The apparatus of claim 1, wherein a thickness of the insulation layer when uncompressed is within a range of approximately ¼ inch to approximately 1 inch.

5. The apparatus of claim 1, wherein an indentation load deflection ("ILD") of the insulation layer is in a range from approximately 10.0 lbs/50 in2 to approximately 32.0 lbs/50 in2.

6. The apparatus of claim 1, wherein a density of the insulation layer is in a range from approximately 1.1 lbs/ft3 to approximately 1.65 lbs/ft3.

7. The apparatus of claim 1, wherein the foam further comprises one or more of fire retardant material, heat resistant material, and flameproof material.

8. The apparatus of claim 1, further comprising a fire protection layer comprising one or more of fire retardant material, heat resistant material, and flameproof material.

9. The apparatus of claim 8, wherein the fire protection layer comprises oxidized polyacrylonitrile fibers.

10. The apparatus of claim 1, further comprising an inner lining layer, wherein the insulation layer is disposed between the inner lining layer and the shell layer.

11. An apparatus, comprising:

a pipe;

an insulation layer surrounding the pipe, the insulation layer comprising open cell foam configured to carry moisture out of an interstitial space between the insulation layer and the pipe, and away from the pipe; and a shell layer applied over the insulation layer, the shell layer comprising a wind resistant, breathable material.

12. The apparatus of claim 11, wherein the open cell foam comprises one or more of fire retardant material, heat resistant material, or flameproof material.

13. The apparatus of claim 11, further comprising a fire protection layer comprising one or more of fire retardant material, heat resistant material, and flameproof material.

14. The apparatus of claim 13, wherein the fire protection layer comprises oxidized polyacrylonitrile fibers.

15. The apparatus of claim 11, wherein a moisture vapor transmission rate ("MVTR") of the insulation layer is approximately 1,150 g/m2/24 hrs.

16. The apparatus of claim 11, wherein a moisture vapor transmission rate ("MVTR") of the insulation layer is in a range from approximately 900 g/m2/24 hrs to approximately 1,200 g/m2/24 hrs.

* * * * *